United States Patent [19]
Nishijima et al.

[11] Patent Number: 5,982,719
[45] Date of Patent: Nov. 9, 1999

[54] DISC AUTO CHANGER FOR RECORDING OR REPRODUCING INFORMATION ON A DESIRED DISC OF A PLURALITY OF DISCS IN A MAGAZINE

[75] Inventors: Tatsumi Nishijima, Hiratsuka; Kyuichiro Nagai, Fujisawa; Tomomi Okamoto, Chigasaki; Ikuo Nishida, Ebina; Kouhei Takita, Hiratsuka; Katsuyuki Tanaka, Kamakura; Takashi Takeuchi, Fujisawa; Toshiyasu Sawano, Yokohama; Katsuhiko Izumi, Chigasaki, all of Japan

[73] Assignee: Hitachi, Ltd., Tokyo, Japan

[21] Appl. No.: 08/614,812

[22] Filed: Mar. 8, 1996

[30] Foreign Application Priority Data

| Mar. 9, 1995 | [JP] | Japan | 7-049433 |
| Mar. 9, 1995 | [JP] | Japan | 7-049434 |

[51] Int. Cl.⁶ .................................................. G11B 17/28
[52] U.S. Cl. ........................................... 369/34; 369/197
[58] Field of Search ...................... 369/36, 178, 191–192, 369/197, 34; 360/92, 98.04, 98.06, 69–70

[56] References Cited

U.S. PATENT DOCUMENTS

| 5,128,912 | 7/1992 | Hug et al. ................................. 369/36 |
| 5,502,697 | 3/1996 | Taki .......................................... 360/92 |
| 5,615,202 | 3/1997 | Enomoto et al. ...................... 369/178 |

FOREIGN PATENT DOCUMENTS

| 1-125783 | 5/1989 | Japan | 369/178 |
| 1-146162 | 6/1989 | Japan | 369/191 |
| 1-173467 | 7/1989 | Japan | 369/178 |
| 5-89586 | 4/1993 | Japan | 369/178 |
| 8502051 | 5/1985 | WIPO | 360/92 |

*Primary Examiner*—Brian E. Miller
*Attorney, Agent, or Firm*—Beall Law Offices

[57] ABSTRACT

The speed of a disc handling operation by a disc apparatus having disc changer capability is significantly increased and, at the same time, the disc handling operation is performed with stability. In the disc apparatus according to this invention, a plurality of reproducing units loaded with discs are moved independently and disc reproduction is started by returning the reproducing units to their dedicated positions. Simultaneous returning of the plurality of reproducing units is prevented and each reproducing unit moves for refuge while reproducing the disc. This novel setup significantly shortens the time for moving the reproducing units for disc reproduction. When continuously reproducing a plurality of discs accommodated in proximity, the plurality of reproducing units are moved in a stacked state rather than independently. This also contributes to a significant reduction of the time in the disc handling operation. Further, when raising the lower reproducing unit in the stack, it is moved together with the upper reproducing unit; when raising the upper reproducing unit, it is separated from the lower reproducing unit for independent movement. This prevents the reproducing units from colliding against each other. The novel constitution significantly enhances ease of use of the disc apparatus.

2 Claims, 6 Drawing Sheets

DISC AUTO CHANGER FOR RECORDING OR REPRODUCING INFORMATION ON A DESIRED DISC OF A PLURALITY OF DISCS IN A MAGAZINE

BACKGROUND OF THE INVENTION

1. Field of the Invention

The present invention relates to a disc apparatus of the automatic changer type for recording or reproducing an information signal on a desired disc taken out of a magazine containing a plurality of discs. More particularly, the present invention relates to a disc apparatus having a plurality of pickup units for recording or reproducing discs to significantly shorten the time (access time) between taking out a disc from the magazine and starting recording or reproducing the disc, and to stabilize such operations.

2. Description of the Related Art

Conventionally, a disc apparatus as mentioned above is known as disclosed in Japanese Non-examined Patent Publication No. Hei 5-89586. This disclosed disc apparatus has a magazine containing a plurality of discs and first and second changer devices for taking desired discs out of the tray for playback. If a subsequent disc to be reproduced is scheduled for playback before the end of playback by the first changer device, the second changer device moves in to reproduce the next selected disc.

Recently, along with the development of multimedia technologies, the video on demand (VOD) system has come to where desired music on CDs (Compact Discs) and movies can be enjoyed at home. A problem to overcome to fully implement and popularize the VOD and CATV (cable television) is to increase the speed of processing a huge amount of data to be supplied to users.

Consequently, for a disc apparatus suitable for implementing such a VOD system, namely a disc apparatus of the automatic changer type in which a plurality of discs such as music CDs, video CDs, and DVD programs are sequentially or simultaneously reproduced by a plurality of pickup units, it is necessary to shorten the disc handling time from loading discs to reproducing them as much as possible.

However, in the conventional apparatus as disclosed in the above-mentioned Japanese un-examined Patent Publication No. Hei 5-89586, the magazine is provided at both sides thereof with dedicated positions at which disc playback is performed by the first and second changer devices. Therefore, for example, if a subsequent playback disc is schedule for playback before the end of the playback being made by the first changer device, the second changer device to perform the next disc receives the same and must move to the dedicated position at which the disc is to be performed by the second changer device. This takes time before starting the playback of the next disc, still presenting a problem that the requirement for the processing speed required for implementing the VOD and CATV systems is not fully satisfied.

In addition, even if the speed requirement is satisfied by some means, achieving the stability of disc handling operations of the apparatus is another problem.

It is therefore an object of the present invention to provide a disc apparatus for selecting desired discs from a magazine, receiving a command for recording or reproducing the selected discs sequentially or simultaneously, and performing as instructed the recording or reproducing of the discs with a relatively short delay time.

It is another object of the present invention to provide a disc apparatus for stably performing the sequential or simultaneous recording or reproducing of selected discs.

SUMMARY OF THE INVENTION

In carrying out the invention and according to one aspect thereof, there is provided a disc apparatus comprising a magazine for storing a plurality of discs, a loader for taking discs from and putting them into the magazine, a plurality of pickup units for recording information signals to or reproducing the same from discs selected from the magazine, a pickup unit drive for moving the pickup units between a standby position in the disc apparatus and a draw-out position suitable for drawing the selected disc from or returning the same into the magazine, and a control circuit for controlling the pickup unit drive such that the same moves between the standby position and the draw-out position in a state in which at least one or more pickup units are recording the information signals to or reproducing the same from discs.

In carrying out the invention and according to another aspect thereof, the plurality of pickup units mentioned above are stacked on one another.

In carrying out the invention and according to still another aspect thereof. when one of the plurality of pickup units is moved between the standby position in the disc apparatus and the draw-out position by the pickup unit drive, if another pickup unit is present between the current position of the pickup unit concerned and the position after the movement of the same, both pickup units move cooperatively; if another pickup unit is not present, the pickup units move independently.

In carrying out the invention and according to yet another aspect thereof, the pickup units in the stacked state arranged in the disc apparatus or the pickup units moving independently in the disc apparatus perform the recording or reproducing of information signals during movement.

For example, the first and second pickup units capable of recording or reproducing the first and second discs respectively are stacked on each other and put in the standby state in the stacked state. When the pickup unit drive moves the first and second pickup units, a first control circuit controls the pickup unit drive such that the first and second pickup units are moved in the stacked state. Consequently, when the first pickup unit has moved to draw out the first disc to record or reproduce information signals on the same, the second pickup unit moving together with the first pickup unit can promptly draw the second disc to record or reproduce information signals on the same. In addition, the resultant reduced moving distance allows the pickup units to quickly perform the disc handling operations ranging from instruction for playback up to disc recording or reproducing.

Moreover, when the first and second pickup units are moving in the stacked state, if a third pickup unit exists in the direction of the movement of the stacked pickup units, performing the recording or reproducing of a third disc, then the first, second, and third pickup units move together in the stacked state; if the third pickup unit is not present in the moving direction, a second control circuit controls the pickup unit drive such that the first and second pickup units keep moving. Consequently, the first, second, and third pickup units can move stably without interfering with each other.

If the first, second, and third pickup units are constituted so that each performs recording or reproducing during movement when they are moving in cooperation, the disc recording or reproducing operation by each is kept performed without interruption.

As described, the disc apparatus according to the present invention, when the pickup units are performing a disc recording or reproducing operation, the pickup units are moved for refuge. This novel setup shortens the wait time until disc recording or reproducing, as compared with the conventional setup in which a disc is loaded in a pickup unit, which is then moved to its dedicated position at which recording or reproducing is performed.

Further, according to the present invention, at least two of the plurality of pickup units are moved in the stacked state. This novel setup shortens the moving distance of the pickup units, as compared with the conventional setup in which the plurality of pickup units are moved separately. This in turn quickens the disc handling operation from receiving a command up to the recording or reproducing of a plurality of discs as instructed.

Still further, when one of the plurality of stacked pickup units is moved, if another pickup unit exists along the moving locus of that one of the plurality of stacked pickup units, both pickup units move in cooperation; if another pickup unit does not exist on the moving locus, both pickup units move separately. This novel setup contributes to the stabilization of the above-mentioned recording or reproducing operation.

The above and other objects, features and advantages of the present invention will become more apparent from the accompanying drawings, in which like reference numerals are used to identify the same or similar parts in several views.

BRIEF DESCRIPTION OF THE DRAWINGS

These and other objects, features and advantages of the present invention will become more readily apparent from the following detailed description when taken in conjunction with the accompanying drawing wherein:

FIG. 6 (B) is a schematic diagram illustrating a constitution of the disc apparatus according to the invention with discs stacked in parallel to the bottom of the apparatus.

DETAILED DESCRIPTION OF THE EMBODIMENTS

Figure 1:
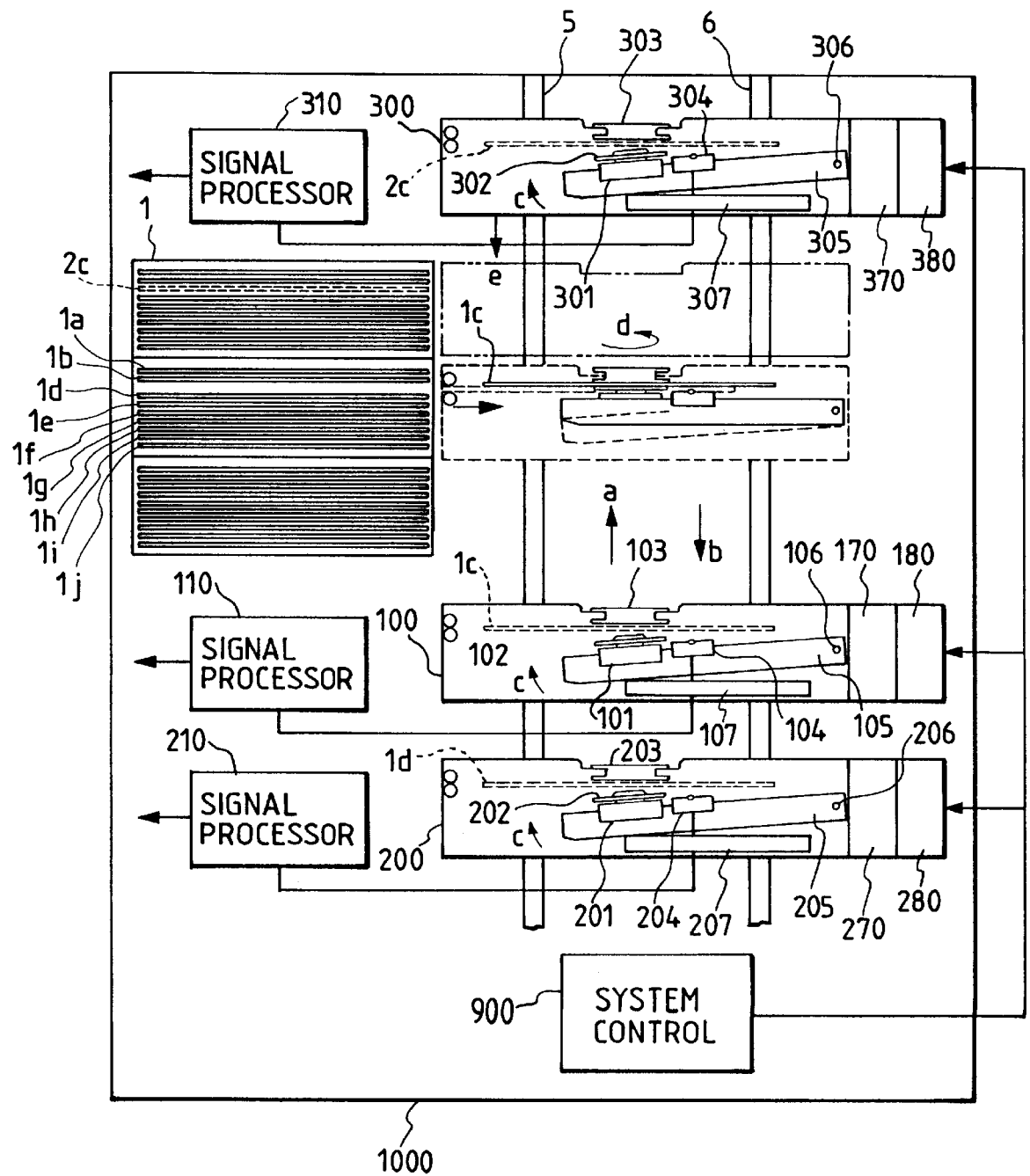
FIG. 1 is a side view illustrating the basic constitution of the disc apparatus practiced as one preferred embodiment of the invention.

This invention will be described in further detail by way of example with reference to the accompanying drawings.

Now, referring to FIG. 1, reference numeral 1 indicates a magazine storing a plurality of optical discs 1a through 1j (the optical discs herein denote a music CD (Compact Disc), a video CD, a photo CD, a CD-ROM, and a DVD (Digital Video Disc) for example, sometimes referred to simply as discs hereinafter) at equal intervals of distance. In the lower portion of the drawing, reference numeral 100 indicates a first pickup unit, reference numeral 101 a disc motor for rotationally driving a disc, reference numeral 102 a turntable, reference numeral 103 a damper that is magnetically chucked onto the turntable 102, reference numeral 104 a first pickup for recording or reproducing information signals on the disc by light beam radiation (the pickup denotes herein a multi-pickup capable of recording or reproducing discs), reference numeral 105 a holder of the first pickup 104, reference numeral 106 a pin providing a pivot for swiveling the holder 105 in the direction c when a disc is loaded into the first pickup unit 100, reference numeral 107 a control circuit for controlling operations of the first pickup unit 100, reference numeral 110 a digital signal processor connected to the first pickup unit 100, reference numeral 170 a disc loader for passing discs between the pickup unit 100 and the magazine 1, and reference numeral 180 a pickup unit drive for moving the pickup unit 100 along guide shafts 5 and 6 in the direction a or the direction b.

It should be noted that, in FIG. 1, reference numeral 200 indicates a second pickup unit and reference numeral 300 a third pickup unit. These pickup units are the same as the first pickup unit 100 in construction, so that the components similar to those previously described are denoted by generally the similar reference numerals. For this reason, the constructions of the pickup units 200 and 300 will not be described. Reference numeral 900 indicates a system control circuit that controls the operations of the first, second, and third pickup units 100, 200, and 300.

Referring to FIG. 1 again, the pickup unit 100 and the pickup unit 200 are disposed in a closely stacked manner and in a standby state. Note that, however, this position is arbitrary, not dedicated.

With both pickup units being in this state, when a command comes to reproduce a disc 1c, a disc 1d, and a disc 2c stored in the tray 1, the system control circuit 900 of FIG. 1 controls the pickup unit drives 180 and 280 such that the same move the first and second pickup units 100 and 200 in the direction a of FIG. 1. Consequently, the first and second pickup units 100 and 200 move in the direction a while maintaining the stacked relationship indicated by solid lines of FIG. 1. The stack stops moving when the first pickup unit 100 has reached a position indicated by broken lines of FIG. 1. When the disc loader 170 feeds the disc 1c from the magazine, the disc 1c is pulled out to a position indicated by broken lines by rotating a roller, not shown, constituting the disc loader 170. Then, when the holder 105 holding the first pickup 104 and other components is moved in the direction c, the disc 1c is inserted in place between the turntable 102 and the damper 103, the inserted disc being indicated by broken lines as shown in FIG. 1.

With the disc 1c being in this state, the control circuit 107 performs control such that the disc 1c is fast rotated in the direction d, the first pickup 104 scans the disc in its radial direction, and known tracking servo and focus servo are performed for recording or reproducing the disc 1c. At the same time, the system control circuit 900 controls the pickup unit drive 180 to move the first pickup unit 100 from the position indicated by broken lines to a position indicated by dot and dash lines for refuge. Consequently, the second pickup unit 200 traveling together with the first pickup unit 100 moves from the position indicated by broken lines at which the disc 1d can be reproduced to a position under that position by one disc to stop. In this state, the disc loader 270 pulls in the disc 1d in the same manner as described above to load the disc 1d between the turntable 202 and the damper 203. As soon as the disc 1d has been loaded in place, the control circuit 207 performs control such that the disc 1d is fast rotated, the second pickup 204 scans the disc 1d in its radial direction, and known tracking servo and focus servo are performed for recording or reproducing the disc 1d.

Thus, the first and second pickup units 100 and 200 are constituted and controlled so that the same move stacked on each other. Therefore, the above-mentioned constitution makes the travel of the second pickup unit 200 shorter, resulting in faster recording or reproducing of the disc 1d by the second pickup unit 200, as compared with a constitution in which, after the first pickup unit 100 has moved from the position indicated by solid lines of FIG. 1 to the position indicated by broken lines to reproduce the disc 1c, for example, the second pickup unit 200 moves from the position indicated by solid lines to the position indicated by broken lines to reproduce the disc 1d, for example. Further, since the first pickup unit 100 that is nearer the magazine 1 is operated before the second pickup unit 200 in the stack, the first pickup unit 100 does not interfere with the movement of the second pickup unit 200.

The following will further extend the above description. The first pickup unit 100 at the position indicated by dot-dash lines in FIG. 1 and the second pickup unit 200 at the position indicated by broken lines move in the direction b for refuge to allow the third pickup unit 300 to record or reproduce the disc 2c. In this state, the system control circuit 900 controls the pickup unit drive 380 to lower the third pickup unit 300 from the position indicated by solid lines to the position indicated by dot-dash lines. The pickup unit 300 stopped at this position pulls in the disc 2c in the same manner as mentioned above, and loads the disc 2c between the turntable 302 and the clamper 303. As soon as the disc 2c has been loaded in place, the control circuit 307 performs control such that the disc 2c is fast rotated, the third pickup 304 scans the disc 2c in its radial direction, and known tracking servo and focus servo are performed for recording or reproducing the disc 2c.

It should be noted that, while the pickup unit 100 and the pickup unit 200 are moving for refuge from their positions indicated by dot-dash lines and broken lines respectively in the direction b of FIG. 1, the system control circuit 900 supplies control signals, not shown, to the control circuits 107, 207, and 307 to instruct that the recording or reproducing of the discs 1c and 1d be continued. Therefore, as compared with the conventional constitution in which the first pickup unit 100 moves its dedicated position after loading the disc 1c to record or reproduce the same for example, the above-mentioned novel constitution can shorten the time before starting the recording or reproducing, increasing the disc recording or reproducing setup speed.

While the disc 1c, the disc 1d, and the disc 2c are being recorded or reproduced under the control of the system control circuit 900, information signals processed by the first, second, and third pickups 104, 204, and 304 installed in the first, second, and third pickup units 100, 200, and 300 respectively are supplied to signal processors 110, 210, and 310 via the first, second, and third control circuits 107, 207, and 307 to be compressed or decompressed. The compressed or decompressed information signals are outputted to the user.

In the above-mentioned operations, the discs 1c, 1d, and 2c are recorded or reproduced by the first, second, and third pickup units 100, 200, and 300 respectively. However, there may be a case in which a command is issued instructing that the disc Ic stored in the tray 1 is to be recorded or reproduced by the first or second pickup unit 100 or 200 at the position indicated by solid lines of FIG. 1, for example, or another command is issued instructing that, although the third pickup unit 300 exists at the position indicated by broken lines, the first and second pickup units 100 and 200 are to move from the positions indicated by solid lines in the direction a. And, in these commands, if, when moving the first and second pickups 100 and 200 in the direction a, the second pickup unit 200 in the lower position is selected, for example, the first pickup unit 100 interferes with the movement of the second pickup unit 200 that goes up.

To overcome this problem, control is made such that, if there is a pickup unit on the travel path of another pickup unit to be moved, both pickup units are moved in cooperation; if no interfering pickup unit exists on the travel path of the pickup unit to be moved, that pickup unit is moved independently.

The above-mentioned operation will be described below in detail.

In the state of FIG. 1, if the disc 1c stored in the tray 1 is to be recorded or reproduced by the second pickup unit 200 at the position indicated by solid lines, the system control circuit 900 controls the pickup unit drive 280 to raise the second pickup unit 200 in the direction a, so that the second pickup unit 200 goes up in the direction a to receive the disc 1c; at the same time, the system control circuit 900 controls the pickup unit drive 180 to also raise the first pickup unit 100 in the direction a. Consequently, there is no physical interference between the moving second pickup unit 200 and the first pickup unit 100.

If the disc 1c is to be recorded or reproduced by the pickup unit 100 at the position indicated by solid lines of FIG. 1, the first pickup unit 100 goes up in the direction a to receive the disc 1c in the same manner as described above; at this time, the system control circuit 900 operates to control the pickup unit drive 180 such that only the first pickup unit 100 goes up. Consequently, the second pickup unit 200 that does not interfere with the movement of the first pickup unit 100 is in the stopped state, thereby saving the energy otherwise lost.

Meanwhile, if a command comes instructing that the first and second pickup units 100 and 200 are to move from the positions indicated by solid lines in the direction a to pull out the discs 1c and 1d from the tray 1 while the third pickup unit exists at the position indicated by broken lines of FIG. 1 and the same is recording or reproducing the disc 2c, the system control circuit 900 operates to control the pickup unit drive 380 such that the third pickup unit 300 at the position indicated by broken lines moves in the direction a for refuge. Consequently, there is no physical interference between the first and second pickup units that go up and the third pickup unit 300.

In what follows, the disc apparatus practiced as other preferred embodiments of the invention will be described with reference to FIGS. 2 through 6.

Figure 2:
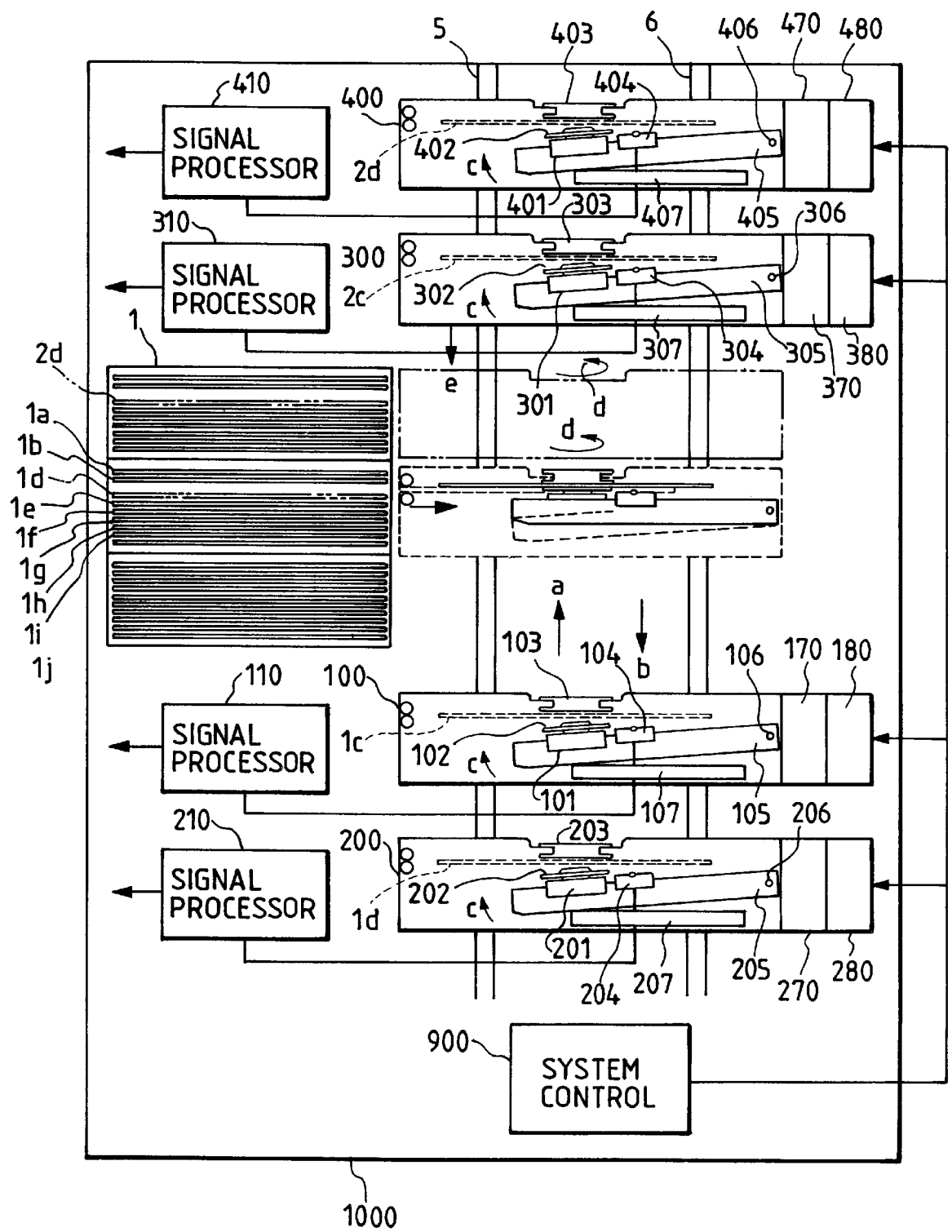
FIG. 2 is a side view illustrating the disc apparatus practiced as another preferred embodiment of the invention.

The constitution of FIG. 2 is generally the same as that of FIG. 1. A difference lies in that the constitution of FIG. 2 has an additional pickup unit 400, of which components are generally the same as those of the first, second, and third pickup units mentioned above. Therefore, the components similar to those previously described with FIG. 1 are denoted by the same reference numerals and omitted herein.

In the state in which a command comes to instruct the reproduction of the discs 1c, 1d, 2c, and 2d, and the first pickup unit 100 for recording or reproducing the disc 1c pulled out at the position indicated by dot-dash line of FIG. 2 and the second pickup unit 200 for recording or reproducing the disc id pulled out at the position indicated by broken lines are moving for refuge in the direction b, when the system control circuit 900 starts operating, the third pickup unit 300 and the fourth pickup unit 400 move in the direction b of FIG. 2 maintaining the stacked state indicated by solid lines. When the third pickup unit 300 reaches the position indicated by dot-dash lines of FIG. 2, the stack stops and the third pickup unit 300 pulls out the disc 2c while recording or reproducing the same. Then the third pickup unit 300 moves to the position indicated by broken lines to stop there. The fourth pickup unit 400 that has been brought by this operation to the position indicated by dot-dash lines pulls in the disc 2d, loads the same between a turntable 402 and damper 403, fast rotates the disc, causes a fourth pickup 404 to scan in the radial direction of the disc, and performs known tracking servo and focus servo, recording or reproducing the disc 2d. Also in the constitution where the four pickup units are used, the first and second pickup units 100 and 200 are stacked on one hand and the third and fourth pickup units 300 and 400 are stacked on the other hand for movement. Consequently, the embodiment of the FIG. 2 also enhances the speed of disc handling operation as compared with the conventional constitution. It should be noted that the embodiment of FIG. 2 also provides the same stable operation as that of the embodiment of FIG. 1 for the same reason, and therefore the description with respect to the stable operation is omitted herein.

Next, the disc apparatus practiced as still another preferred embodiment of the invention will be described with reference to FIG. 3.

Figure 3:
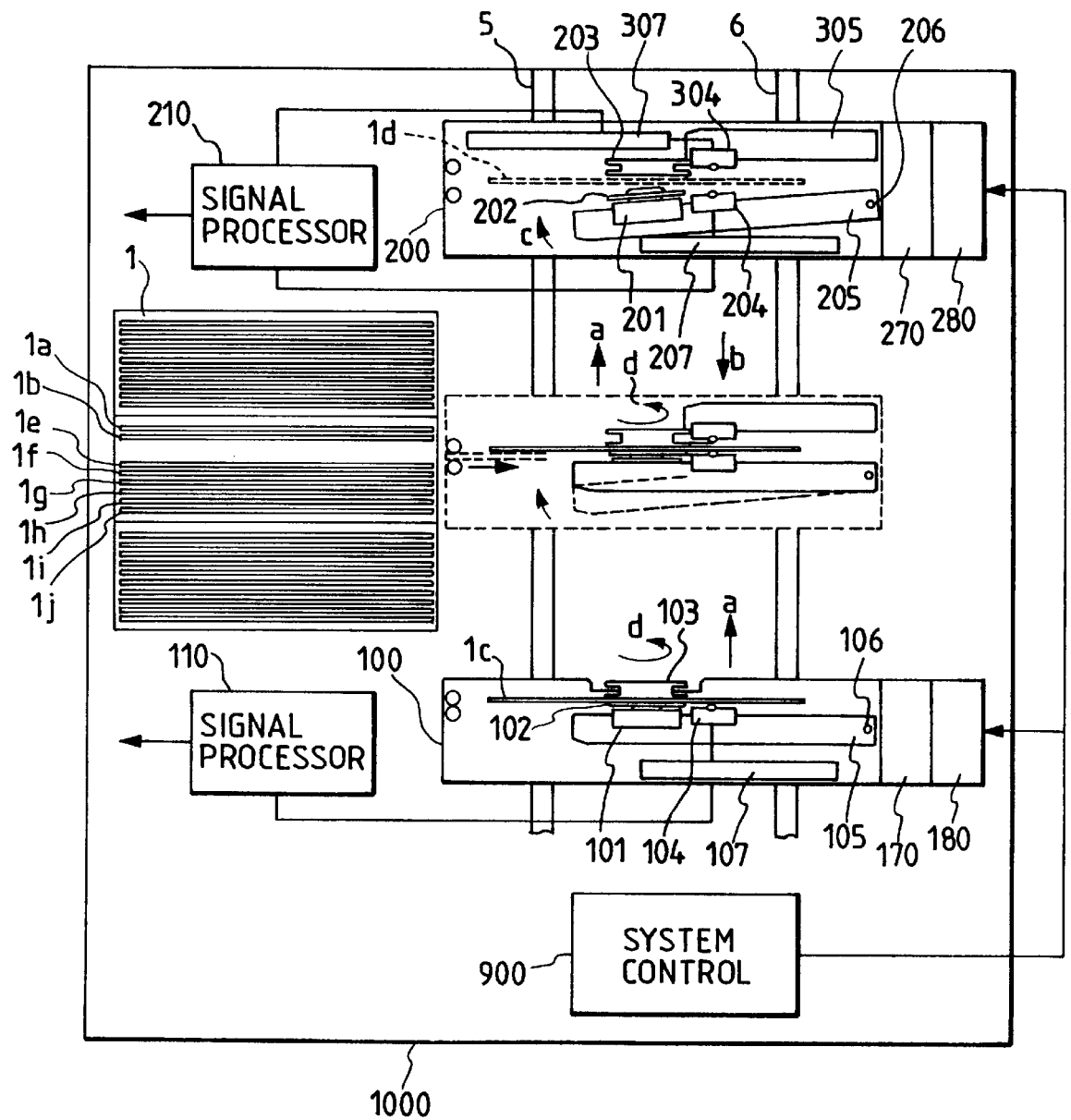
FIG. 3 is a side view illustrating the disc apparatus practiced as another preferred embodiment of the invention.

The embodiment of FIG. 3 is a disc apparatus capable of reproducing both sides of a disc. This embodiment comprises two pickup units 100 and 200, the magazine 1, and the system control circuit 900 among others. The pickup unit 100 is the first pickup unit of FIGS. 1 and 2 that records or reproduces the disc 1c. The pickup unit 200 is the second pickup unit for both-side reproduction and comprises a pickup 304 for recording or reproducing the upper recording area, not shown, of the disc 1d, a pickup 204 for recording or reproducing the lower recording area, not shown, of the disc 1d, and control circuits 307 and 207. The other components are generally the same as those of FIGS. 1 and 2, denoted by the same reference numerals, and omitted from the description herein.

Referring to FIG. 3, when the second pickup unit 200 is located at the position indicated by broken lines and the first pickup unit 100 is located at the position indicated by solid lines below the second pickup unit, if a command comes instructing the continuous reproduction of the discs 1d and 1c, the system control circuit 900 first controls the disc loader 270 such that the disc 1d is loaded in the second pickup unit 200, then controls the control circuits 207 and 307 such that the disc 1d is recorded or reproduced at the lower and upper sides thereof by the pickups 204 and 304, respectively, for both-side reproduction. Then, the system control circuit 900 controls the pickup unit drive 180 such that the first pickup unit 100 is moved in the direction a to load the disc 1c in the first pickup unit 10 (and record and reproduce the disc 1c. At this time, too, the system control circuit 900 control circuit the controls 207 and 307 such that the two-side d reproduction of the disc 1d is continued and, at the same time, controls the pickup unit drive 280 such that the second pickup unit 200 moves in the direction a. This also contributes to the enhanced speed of disc handling operations ranging from the entry of the command up to the continuous reproduction of the discs 1d and 1c like the cases of FIGS. 1 and 2.

The disc apparatus practiced as yet another preferred embodiment of the invention will be described with reference to FIG. 4.

Figure 4:
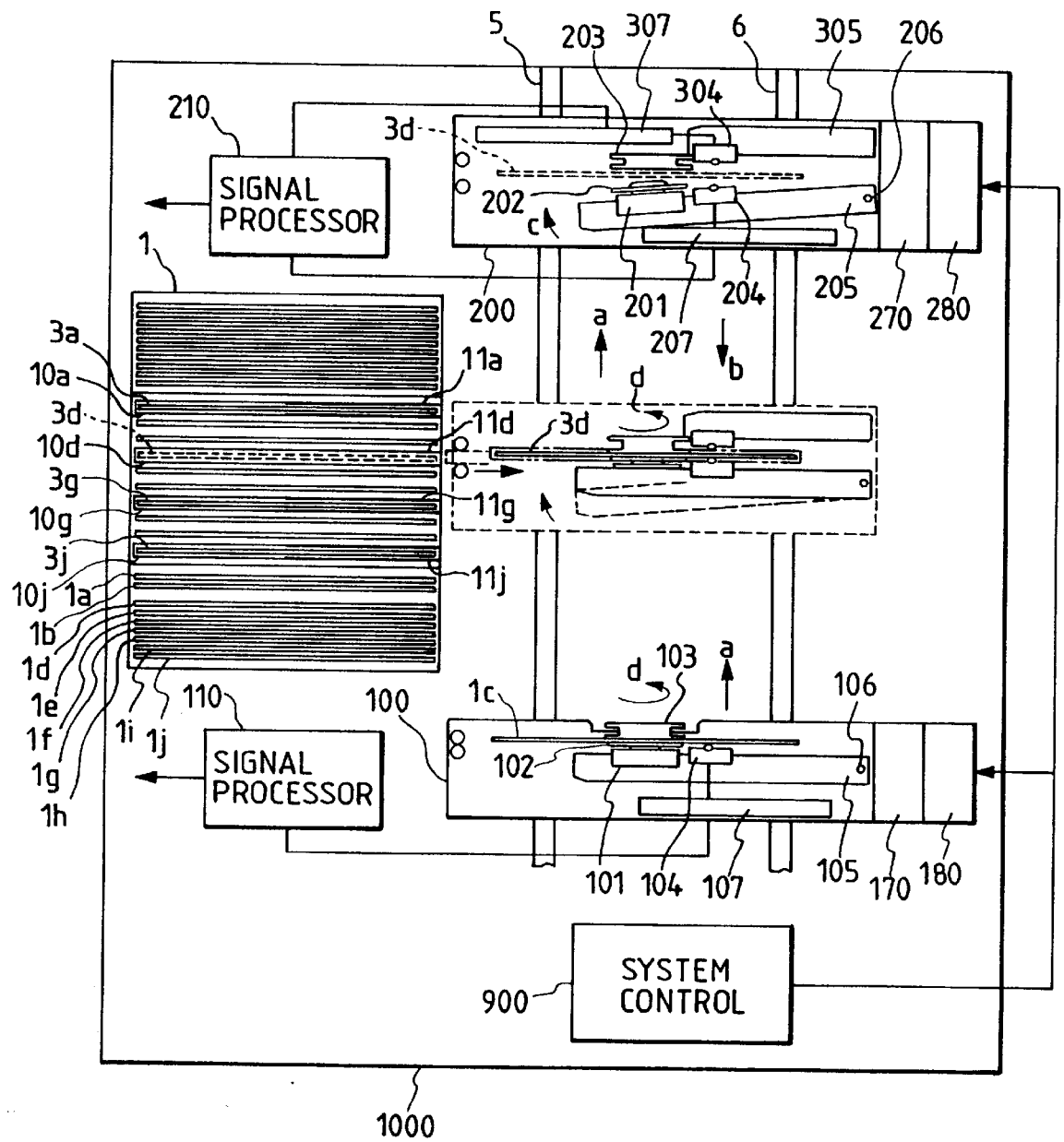
FIG. 4 is a side view illustrating the disc apparatus practiced as another preferred embodiment of the invention.

The constitution of FIG. 4 is generally the same as that of FIG. 3. A difference lies in that the constitution of FIG. 4 stores each of two-side discs 3a, 3d, 3g, and 3j in a dedicated cartridge. Namely, referring to FIG. 4, reference numerals 10a, 10d, 10g, and 10j indicate cartridges, which are formed by shutters 11a, 11d, 11g, and 11j respectively, and each shutter opens or closes a window, not shown. A magazine 1 contains these disc cartridges 10a, 10d, 10g, and 10j together with the discs 1a through 1j. Reference numeral 200 indicates a second pickup unit in which the cartridge 10a, 10d, 10g, or 10j is loaded. Like the constitution of FIG. 3, the pickup unit 200 comprises a pickup 304 for recording or reproducing the upper side of the two-side d disc 1d and a pickup 204 for recording or reproducing the lower side of the disc 1d. The other components are generally the same as those of the embodiment of FIG. 3, denoted by the same reference numerals, and omitted from the description herein.

In operation, when the second pickup unit 200 is at the position indicated by broken lines at the center position of the disc apparatus and the first pickup unit 100 is at the position indicated by solid lines in the lower portion of the disc apparatus as shown in FIG. 4, if a command comes instructing the continuous reproduction of the discs 3d and 1c in the cartridge, the system control circuit 900 first controls a cartridge loader 271 such that the cartridge 10d is loaded in the second pickup unit 200. When the cartridge 10d has been loaded to open the shutter 11d, the system control circuit 900 controls the control circuits 207 and 307 such that the disc 3d stored in the cartridge 10d is recorded or reproduced at the lower side and the upper side thereof by the pickup 204 and the pickup 304, respectively, for both-side reproduction. Then the system control circuit 900 controls the pickup unit drive 180 such that the first pickup unit 100 is moved in the direction a of FIG. 3 to load the disc 1c in the first pickup unit 100 to be recorded or reproduced. At this time, too, the system control circuit 900 controls the control circuits 207 and 307 such that the both-side reproduction of the disc 3d in the cartridge is continued and, at the same time, controls the pickup unit drive 280 such that the second pickup unit 200 is moved in the direction a of FIG. 3 for refuge. This also contributes to the enhanced speed of disc handling operations ranging from the entry of the command to the continuous reproduction of the discs 3d and 1c like the case of FIG. 3.

The disc apparatus practiced as a different preferred embodiment will be described with reference to FIGS. 5 and 6.

Figure 5:
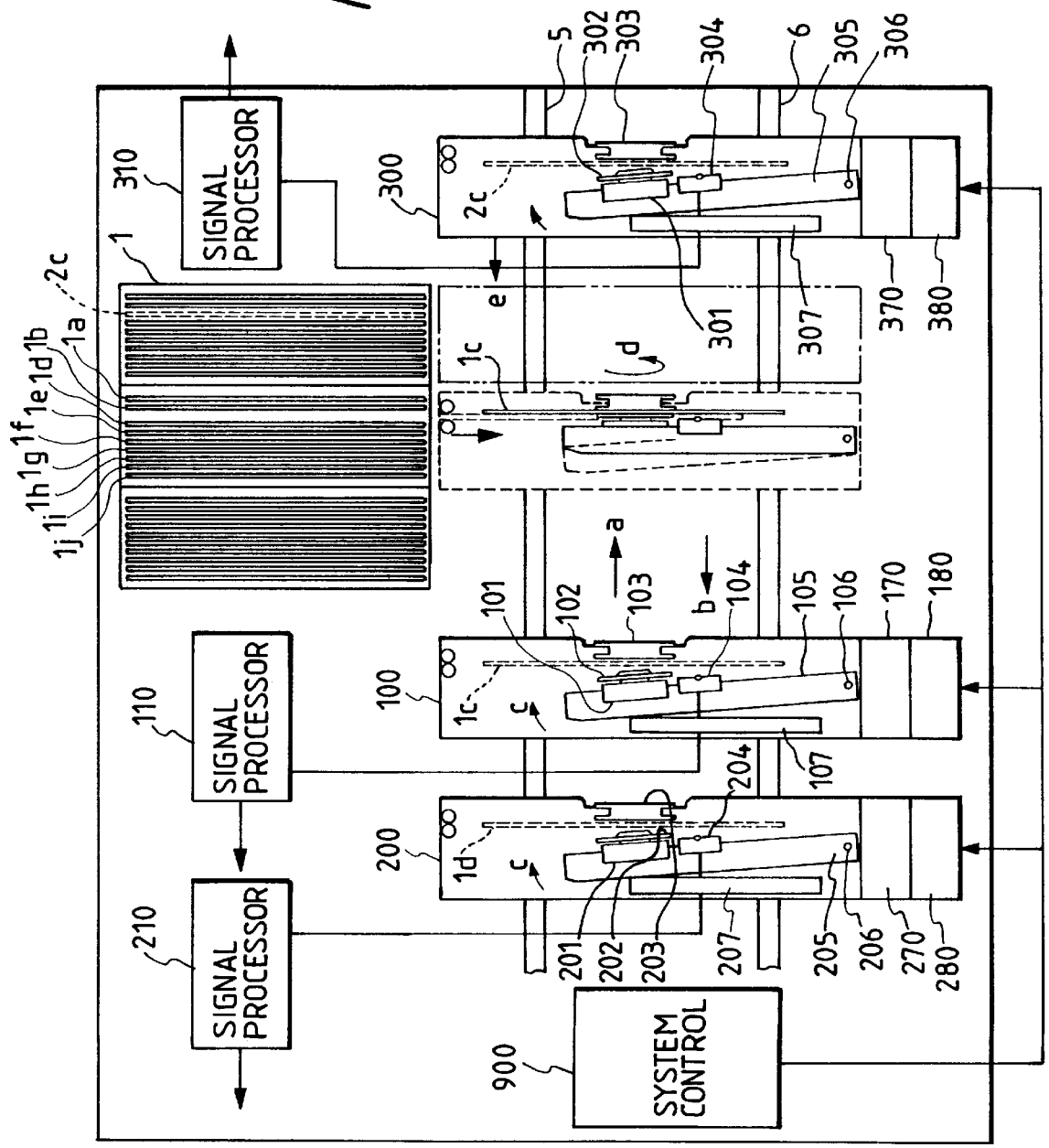
FIG. 5 is a side view illustrating the disc apparatus practiced as a different preferred embodiment of the invention.
Figure 6A:
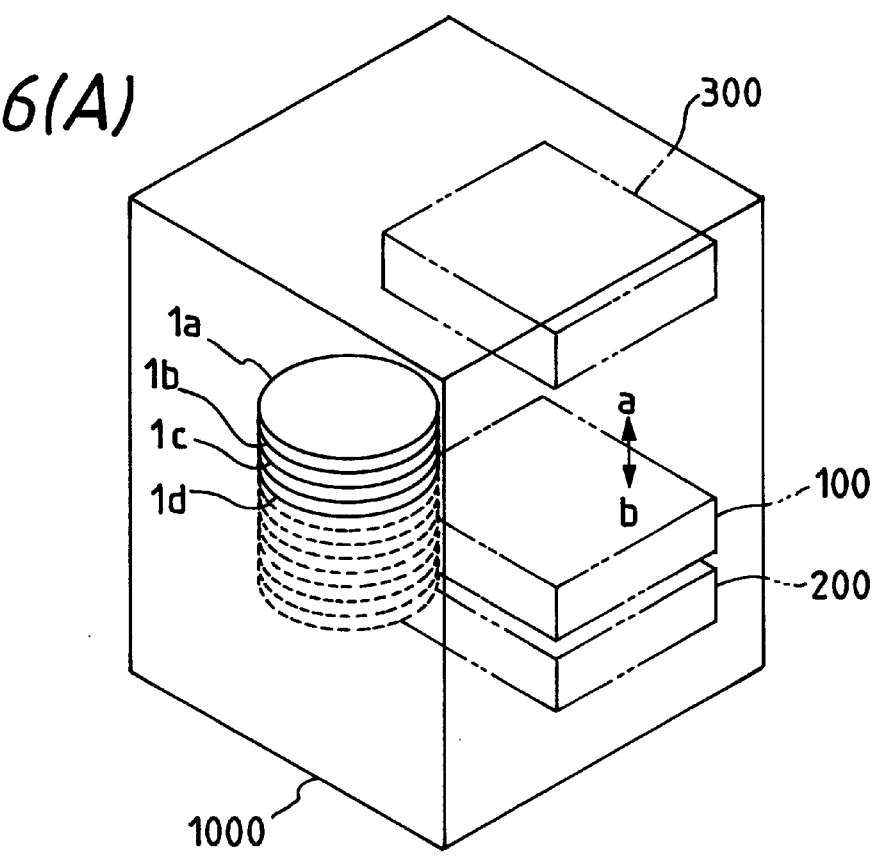
FIG. 6 (A) is a schematic diagram illustrating a constitution of the disc apparatus according to the invention with discs stacked perpendicular to the bottom of the apparatus.
Figure 6B:
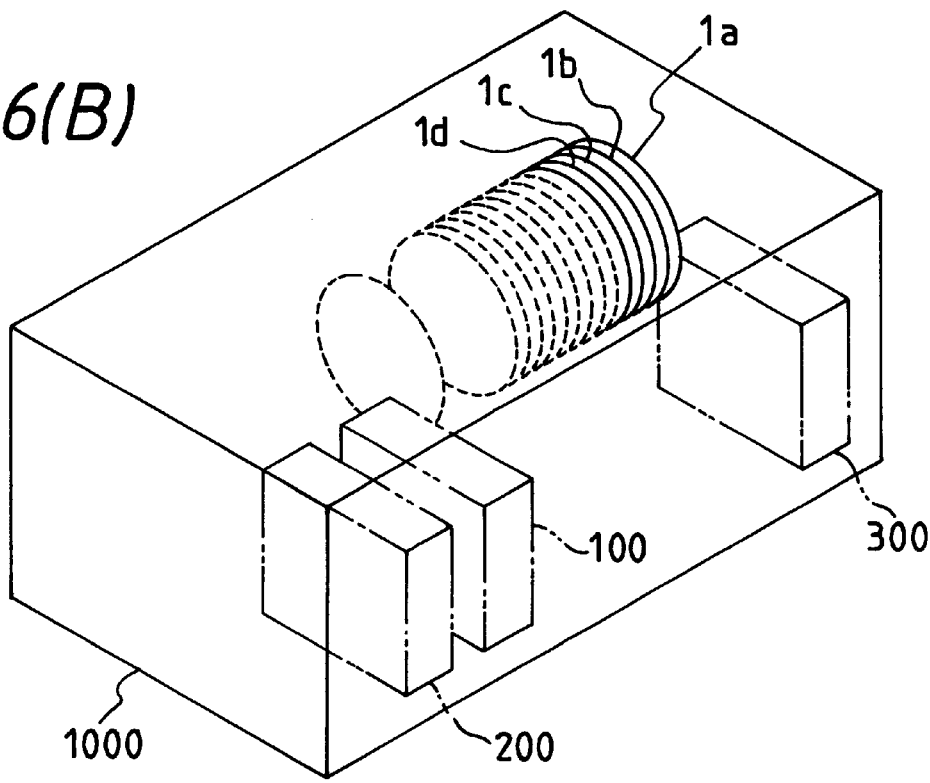

FIG. 6 shows schematic views of the disc apparatus. To be specific, FIG. 6 (A) shows a constitution of the disc apparatus according to the invention in which discs are stacked perpendicular to the bottom surface 1000 of the apparatus, each of the discs facing the bottom. FIG. 6 (B) shows another constitution in which discs are stacked along the bottom surface 1000 of the apparatus, or each of the discs facing sides of the apparatus. 10 The constitutions of the preferred embodiments shown in FIGS. 1 through 4 are of the constitution of FIG. 6 (A). It will be apparent that the disc apparatus according to the present invention is restricted to the constitution of FIG. 6 (A). The constitution of FIG. 6 (B) is also possible and the embodiment of FIG. 5 is based on that constitution.

Now, referring to FIG. 5, this constitution has all of the components of that of FIG. 1. The lies only in the orientation of the disc stack; that is, the disc stack runs along the bottom surface 1000 of the disc apparatus. In function, the embodiment of FIG. 5 is basically the same as that of FIG. 1. That is, a system control circuit 900 performs control such that first, second, and third pickup units 100, 200, and 300 are moved in the direction a or the direction b (horizontal directions) while discs 1c, 1c, and 2c loaded in the respective pickup units are being reproduced, resulting in the a significantly enhanced speed of the disc handling operation. In the above-mentioned operation, moving the first and second pickup units 100 and 200 in a stacked state contributes to the faster movement of the pickup units.

While the preferred embodiments of the present invention have been described using specific terms, such description is for illustrative purposes only, and it is to be understood that changes and variations may be made without departing from the spirit or scope of the appended claims.

The invention may be embodied in other specific forms without departing from the spirit or essential characteristics thereof. The present embodiment is therefore to be considered in all respects as illustrative and not restrictive, the scope of the invention being indicated by the appended claims rather than by the forgoing description, and all changes which come within the meaning and trange of equivalency of the claims are therefore intended to be embraced therein.

What is claimed is:

1. A disc auto changer for recording or reproducing a plurality of discs comprising:

a magazine for accommodating the plurality of discs;

a loader for drawing a desired disc out of said magazine and storing said disc back into said magazine;

a plurality of pickup units for recording or reproducing an information signal on said disc disposed for travel along the same axis;

a pickup unit drive for selectively moving said plurality of pickup units in independent movement and synchronous movement; and a control circuit for controlling said pickup unit drive such that, when one of said plurality of pickup units with said loader moves to a predetermined position to perform one of operations of said loader including drawing a desired disc from said magazine and storing said disc back into said magazine, if another of said plurality of pickup units exists on a travel path of said one of said plurality of pickup units on said axis, said one of said plurality of pickup units and said another of said plurality of pickup units move synchronously to avoid a collision; if said another of the plurality of pickup units does not exist on said travel path of said one of said plurality of pickup units on said axis, said one of said plurality of pickup units moves independently.

2. A method of recording or reproducing on a plurality of discs of a disc auto changer which includes a plurality of pickup units for recording or reproducing an information signal to at least one of the plurality of discs, and a loader for drawing a desired disc out of a magazine and storing a disc into said magazine, the method comprising the steps of:

selectively moving said plurality of pickup units along the same axis using a pickup unit drive to record or reproduce an information signal on or from a disc drawn by said loader; and controlling said pickup unit drive such that, when one of said plurality of pickup units with said loader moves to a predetermined position to perform one of operations of said loader including drawing a desired disc from said magazine and storing said disc back into said magazine, if another of said plurality of pickup units exists on a travel oath of said one of said plurality of pickup units on said axis, said one of said plurality of pickup units and said another of said plurality of pickup units move synchronously to avoid a collision; if said another of said plurality of pickup units does not exist on the travel path of said one of said plurality of pickup units on said axis, said one of said plurality of pickup units moves independently.

\* \* \* \* \*